Jan. 14, 1958   R. C. MYERS   2,819,516
APPARATUS FOR ASSEMBLING CAN SPOUT PARTS
Filed April 5, 1955   3 Sheets-Sheet 1
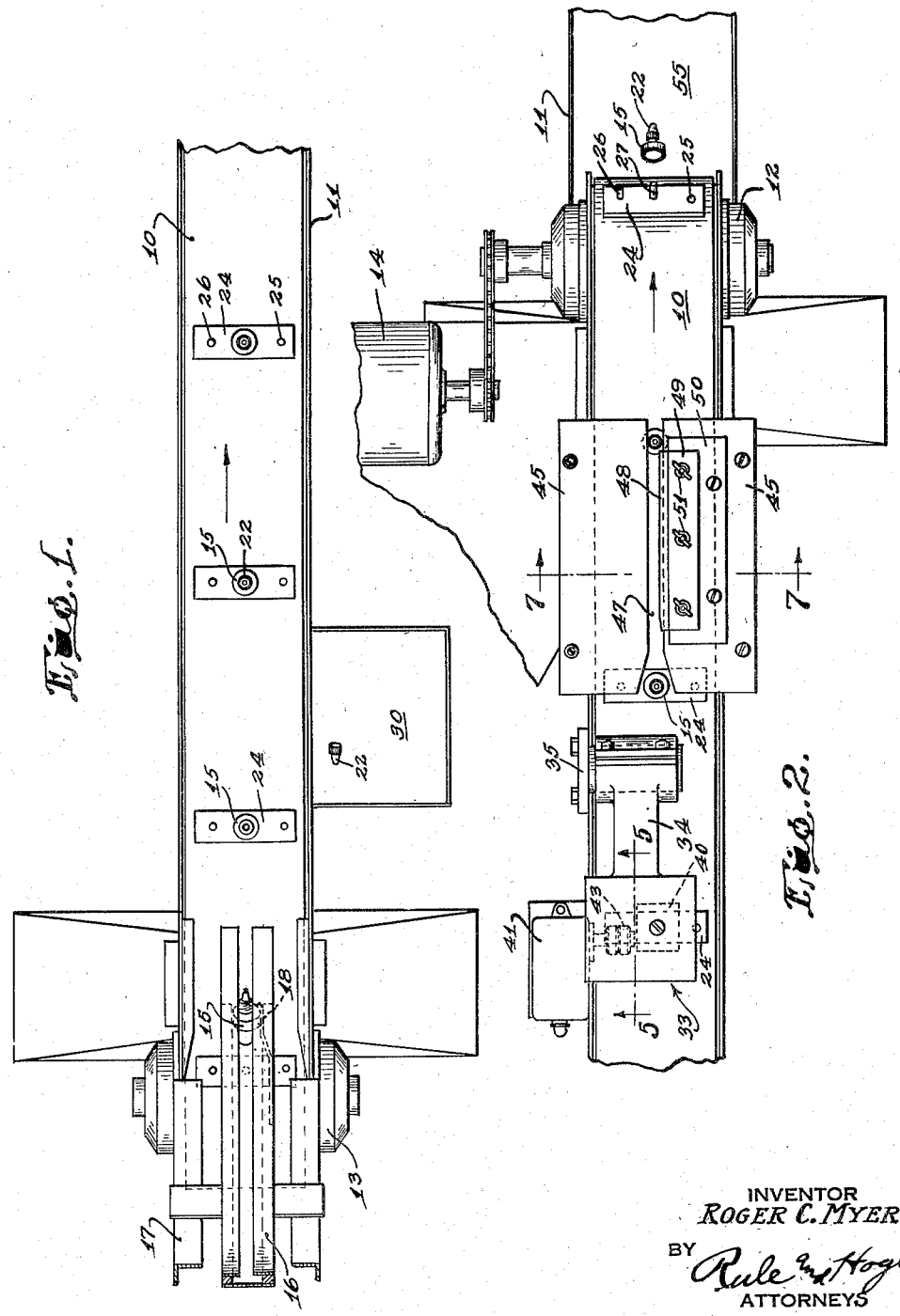
INVENTOR
ROGER C. MYERS
BY
ATTORNEYS

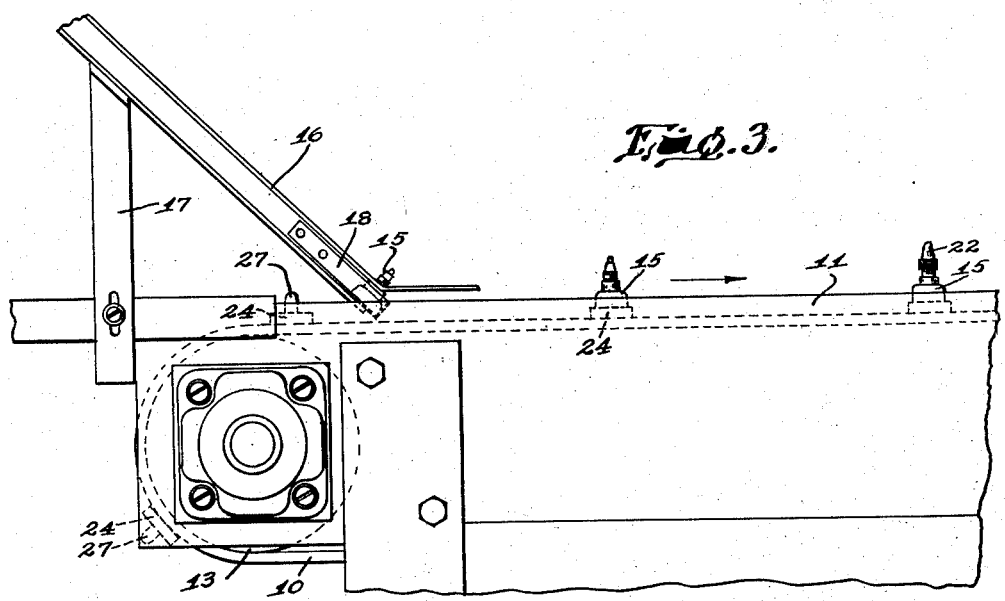
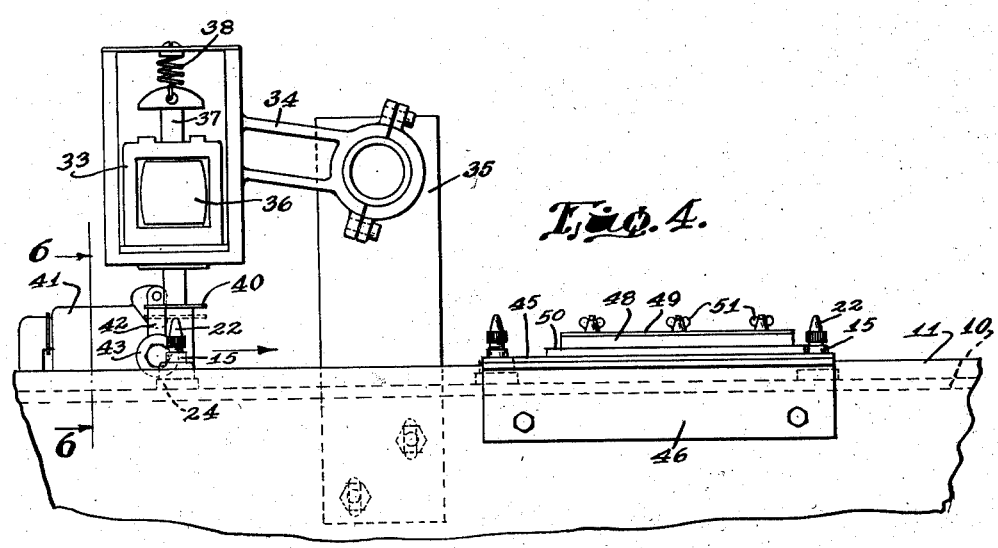
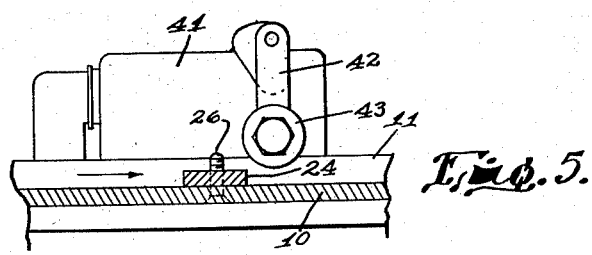
INVENTOR
ROGER C. MYERS
BY
ATTORNEYS

INVENTOR
ROGER C. MYERS
BY
ATTORNEYS

United States Patent Office 2,819,516
Patented Jan. 14, 1958

2,819,516

APPARATUS FOR ASSEMBLING CAN SPOUT PARTS

Roger C. Myers, Pitman, N. J., assignor to Owens-Illinois Glass Company, a corporation of Ohio Application April 5, 1955, Serial No. 499,340

9 Claims. (Cl. 29—240)

My invention relates to apparatus for assembling separate parts of articles and is particularly adapted for assembling parts having a screw-threaded connection. The invention is of utility in assembling the parts of spouts for cans or other containers and is herein illustrated and described as used for such purpose.

Can spouts are commonly provided with a removable cap or tip which forms a closure for the spout outlet, such tip having a screw-threaded connection with the spout. In accordance with my invention the spouts are fed to a horizontally traveling belt conveyor. The spout tips are loosely placed on the spouts as they advance with the conveyor. The spout and its removable tip are provided with screw threads. The invention provides means for giving each cap or tip a light tap by which the cap is forced downward to an intermediate position with the first threads interengaged so that the cap is loosely held on the spout by the screw threads. As the assembled spouts and caps are advanced with the conveyor, the caps are brought into contact with a stationary frictional tightening device or rail by which the caps are rotated and thereby screwed into fully assembled position on the spouts. The means employed for tapping the spout caps or tips comprises an electromagnet mounted over the path of the spouts. The solenoid of the magnet is automatically energized as each spout passes thereunder and the armature thereby given a downward stroke for tapping and forcing the cap into holding engagement with the spout. The can spouts and their closure caps or tips are commonly made of a thermoplastic material which is sufficiently pliable and resilient to permit the tip to be sprung into its temporary holding position by a moderate tap of the armature.

Referring to the accompanying drawings which illustrate a preferred form of the apparatus:

Fig. 1 is a part sectional plan view showing a portion of the apparatus;

Fig. 2 is a similar view, complemental to Fig. 1, showing a portion of the apparatus extending to the right from that shown in Fig. 1;

Fig. 3 is a fragmentary side elevational view of parts shown in Fig. 1;

Fig. 4 is a side elevation of the electromagnet and adjacent parts;

Fig. 5 is a sectional view at the line 5—5 on Fig. 2, showing a switch and its operating means;

Figure 6:
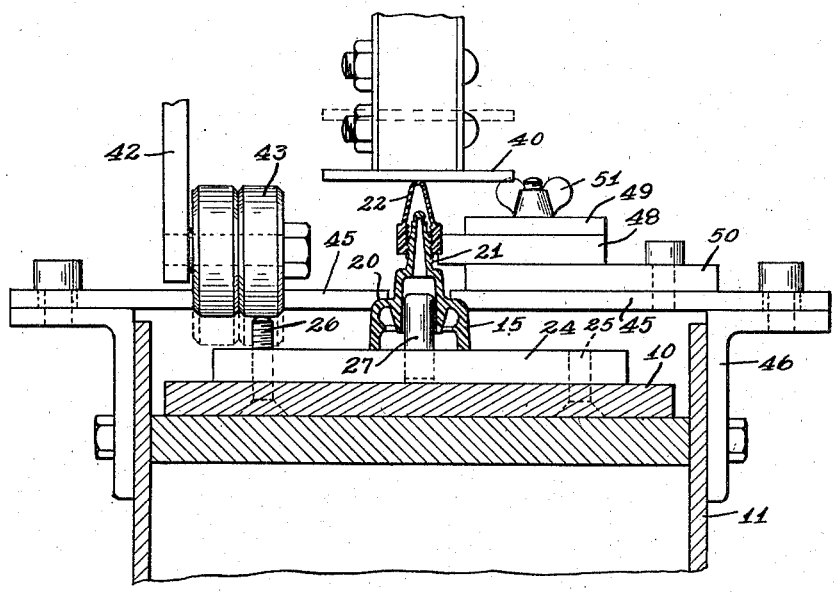
Fig. 6 is a cross sectional view of the apparatus at the line 6—6 on Fig. 4.

Referring particularly to Figs. 1 and 2, a horizontally traveling belt conveyor 10 is mounted in a conveyor frame 11. The belt is trained over a driving pulley 12 and a driven pulley 13. The belt is continuously driven by an electric motor 14 having a chain driving connection with the pulley 12. Can spouts 15 are fed to the conveyor 10 through an inclined chute 16 mounted on an adjustable frame 17. The spouts 15 are fed through the chute by gravity and arrested at the lower end of the spout by the leaf spring 18 which frictionally holds the spout temporarily.

The spout 15 as shown is of a generally tapered contour and is formed intermediate its upper and lower ends with a shoulder 20. The upper end portion of the spout is formed with external screw threads 21 for cooperation with screw threads formed on the inner surface of the tip 22 which forms a closure for the discharge end of the spout.

Mounted on the conveyor belt 10 and uniformly spaced lengthwise of the belt are cross bars 24. Each of these bars is secured to the belt by rivets or screws 25 and 26. The screws 26 are extended upwardly above the bars 24 for actuating a switch as hereinafter described.

Each of the cross bars 24 has secured thereto a peg 27 extending upwardly at the middle of the bar and serves as a means for transferring the spouts from the chute 16 of the belt conveyor. Each transfer peg 27 as it advances beyond the rear conveyor pulley 13 is brought into register with an inclined spout 15 held by the spring 18 and carries the spout forward. After a spout has thus been positioned on the transfer peg a closure cap 22 is dropped thereon. The placing of the tips 22 on the spouts may be done either automatically or manually, as by an operator transferring them from the platform 30.

As the spouts with the tips thereon are carried forward they pass beneath a tapping device by which the tips are pressed or tapped downwardly into loosely threaded engagement with the spouts. Referring to Fig. 4, this tapping device comprises an electromagnet 33 mounted in a bracket 34. The bracket is carried on uprights 35 on the conveyor frame. The electromagnet includes the solenoid 36 and armature or core 37. While the magnet is de-energized the armature is held in its upper or retracted position by a tension coil spring 38. The armature has attached thereto at its lower end a plate 40 directly over the path of the spouts. A switch 41 in circuit with the solenoid 36, comprises a depending rock arm 42. A roll or rolls 43 (Figs. 5 and 6) on the rock arm 42 extend into the path of the screws 26. Each of these screws as it advances engages a roll 43 and swings the arm 42 thereby operating the switch and closing a circuit for the magnet solenoid.

The electromagnet being thus energized, the armature is drawn down, against the tension of the spring 38, so that the plate 40 taps the cap 22, applying sufficient downward force to cause the lower threads on the cap to engage the screw threads on the spout. The cap is thus held on the spout in a manner to permit the final tightening operation.

Figure 7:
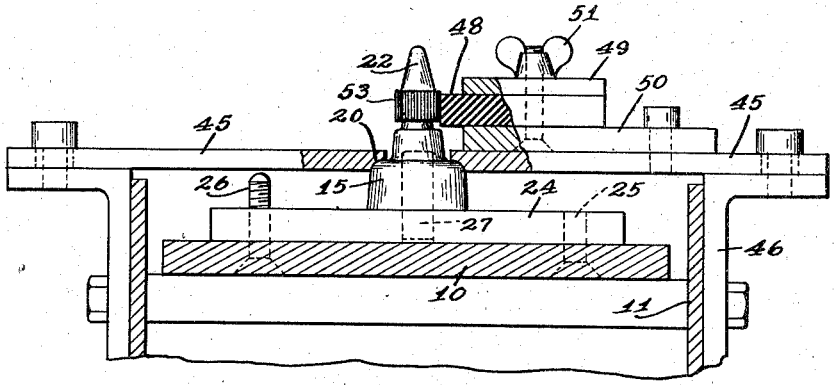
Fig. 7 is a section at the line 7—7 on Fig. 2.

As the spouts with the caps thereon advance beyond the tapping station they are brought to a cap tightening station where the caps are screwed tightly on to the spouts. At the tightening station a pair of guide plates 45 are attached by brackets 46 (Figs. 6 and 7) to the conveyor frame, the plates being spaced apart to provide a channel or guideway 47 along which the spouts are carried. A screw tightening device 48, in the form of a rail, consisting of rubber or like material, is clamped between upper and lower bars 49 and 50, the lower bar 50 being attached to the bar 45. The rail 48 is clamped in position by screws with wing nuts 51. The rail 48 is positioned to contact a knurled portion 53 of the cap 22 thereby rotating the cap and tightening it on the spout as they advance along the rail 48. The stationary guide plates 45 are shaped and positioned to extend over the shoulders 20 of the spouts 15 and frictionally hold the spouts against rotative movement as they advance along the rail 48. The spouts with the caps tightened thereon are carried with the belt over the pulley 12 and thereby inverted so that the caps drop off the pegs 27 on to a chute 55.

Modifications may be resorted to within the spirit and scope of my invention.

I claim:

1. Apparatus for assembling and tightening screw-threaded caps on articles, said apparatus-comprising a horizontally traveling conveyor on which the articles are supported with the caps loose on the articles, a tapping device positioned over the path of the articles on the conveyor, said tapping device including a tapping element mounted for up-and-down movement, and automatic means for moving said element downwardly as each said article with the cap thereon passes beneath said element and thereby tapping the cap into holding engagement with the said article.

2. The apparatus defined in claim 1, said apparatus including cap tightening means positioned beyond said tapping device and operable to rotate the caps and thereby tighten them.

3. Apparatus for assembling and tightening screw-threaded caps on spouts, said apparatus including a horizontally traveling belt conveyor, pegs mounted on the conveyor at intervals lengthwise thereof and projecting upwardly for holding the spouts in upright position on the conveyor, and tapping means for tapping screw-threaded caps downwardly on the spouts as they advance with the conveyor.

4. The apparatus defined in claim 3, said tapping means comprising an electromagnet mounted above the path of the spouts and including an armature movable downward when the electromagnet is energized, and automatic means for completing a circuit for the electromagnet while a spout with a cap thereon is passing beneath the armature and thereby tapping the cap into holding position on the spout.

5. The apparatus defined in claim 4, including a switch in circuit with the electromagnet winding, and means for closing the switch as a spout with the cap thereon is brought beneath the armature.

6. The combination set forth in claim 5, the means for actuating said switch comprising an arm connected to the switch, and switch operating devices mounted on the conveyor and projecting into position to engage said arm and operate the switch.

7. Apparatus for assembling can spouts and screw-threaded caps and tightening the caps on the spouts, said apparatus comprising a horizontally traveling conveyor, means for continuously driving the conveyor, spout holding pegs mounted on the conveyor at uniformly spaced intervals lengthwise thereof and projecting upwardly from the conveyor, a chute mounted over the conveyor through which the spouts are carried into position to be picked up by the said pegs, a tapping device mounted over the path of the spouts on the pegs, said tapping device including a tapping element, and automatic means for imparting a downward stroke to the tapping element as each spout with a cap loosely placed thereon passes beneath said tapping element and thereby tapping the cap downwardly on the spout.

8. The apparatus defined in claim 7, the said tapping device comprising an electromagnet and its armature, a spring by which the armature is held in an upward position while the electromagnet is de-energized, said electromagnet operable to impart said downward stroke to the tapping element, a switch in circuit with the electromagnet, switch operating pins mounted on the conveyor, and a switch operating arm projecting into the path of said pins and operable by said pins to close the switch as the spouts with the caps thereon pass beneath the tapping device.

9. The combination set forth in claim 8, including means for rotating and tightening the caps on the spouts after they pass beyond the said tapping means, said tightening means comprising a pair of stationary guides extending lengthwise of the conveyor and spaced to provide a channel through which the spouts are conveyed, said guides being positioned to engage and apply downward pressure of the spouts on the conveyor, thereby holding the spouts against rotation, and a cap tightening rail mounted above and extending lengthwise of said channel in position to contact lateral surfaces of the caps on the spouts and thereby rotate each cap and tighten it on the spout while advancing along said channel.

References Cited in the file of this patent

UNITED STATES PATENTS 1,669,726     Seale _____ May 15, 1928